United States Patent [19]

Eldeen

[11] 4,367,864
[45] Jan. 11, 1983

[54] NEWEL POST ASSEMBLY

[76] Inventor: Gene H. Eldeen, 17861 Jaguar Path, Lakeville, Minn. 55044

[21] Appl. No.: 215,798

[22] Filed: Dec. 12, 1980

Related U.S. Application Data

[63] Continuation-in-part of Ser. No. 123,841, Feb. 22, 1980, Pat. No. 4,295,638.

[51] Int. Cl.³ .............................................. E04H 17/14
[52] U.S. Cl. ...................................... 256/59; 403/262
[58] Field of Search ............... 403/230, 231, 258, 260, 403/262; 52/292, 296; 256/65, 59

[56] References Cited

U.S. PATENT DOCUMENTS

| | | | |
|---|---|---|---|
| 708,936 | 9/1902 | Strom | 52/292 |
| 723,669 | 3/1903 | Hammann | 52/292 |
| 1,734,340 | 11/1929 | Overton | 403/258 X |
| 2,820,262 | 1/1958 | Dunn | 52/298 |
| 3,253,373 | 5/1966 | Diack | 52/292 |
| 3,603,546 | 9/1971 | Ruffert | 403/230 |
| 3,835,610 | 9/1974 | Harper et al. | 403/231 X |

*Primary Examiner*—Andrew V. Kundrat
*Attorney, Agent, or Firm*—Burd, Bartz & Gutenkauf

[57] ABSTRACT

A newel post assembly to locate a newel post at any desired necessary location in a secure and sturdy manner. The assembly includes a newel post for intended use in a generally upright orientation, and a newel post anchor plate or base assembled to the transverse bottom surface of the newel post. The base includes a plurality of first holes upwardly countersunk from the bottom of the base and a plurality of fasteners fastened through the first holes to secure the newel post to the base. A plurality of second holes are located in surrounding relationship to the first holes and are downwardly countersunk and accommodate a plurality of second fasteners for securing the base to a floor type surface.

17 Claims, 13 Drawing Figures

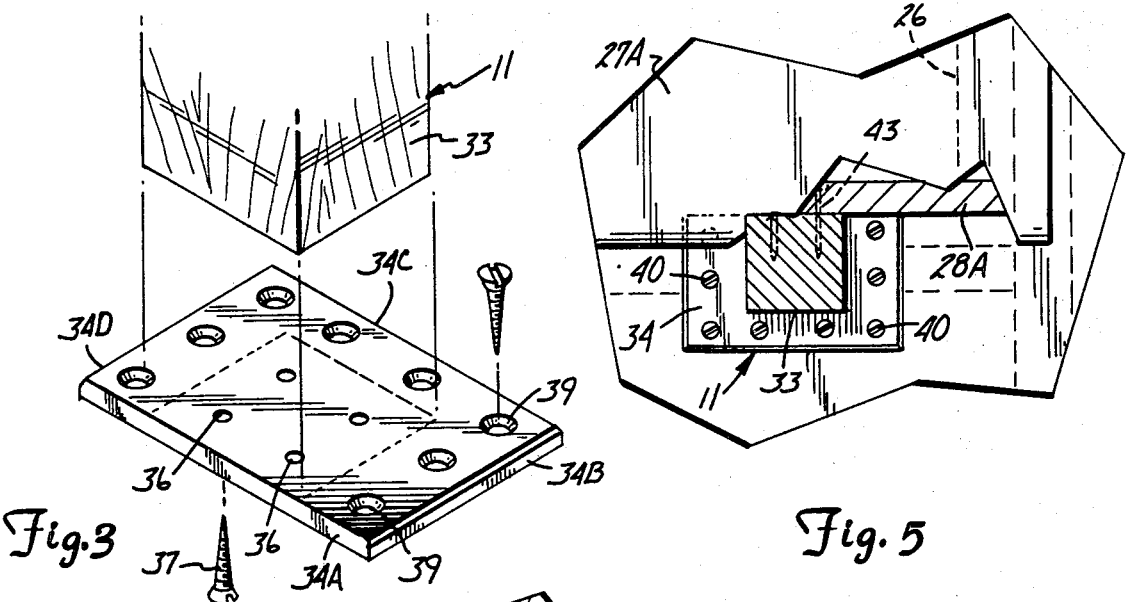
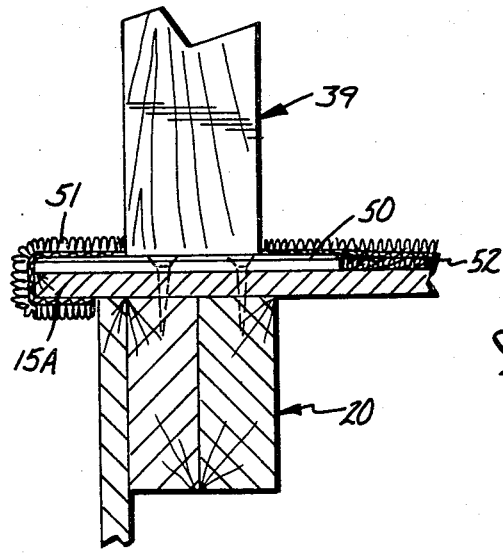
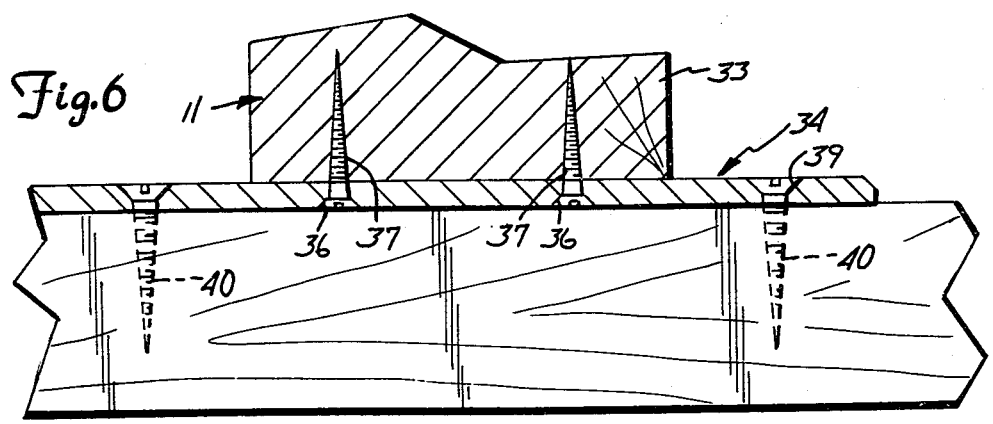

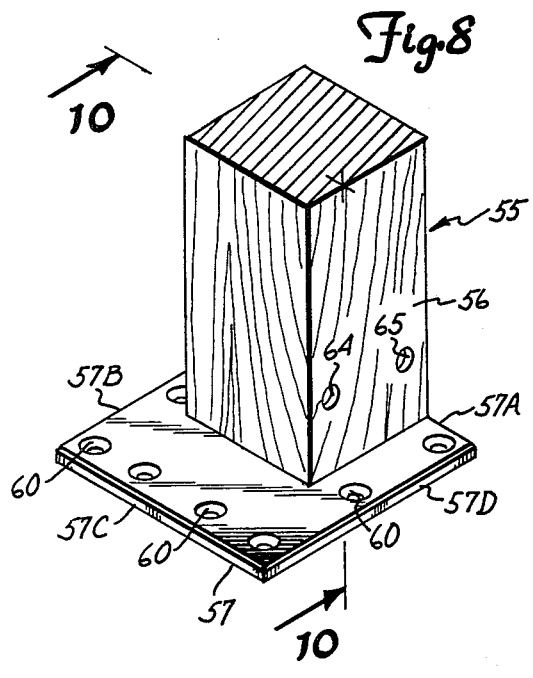
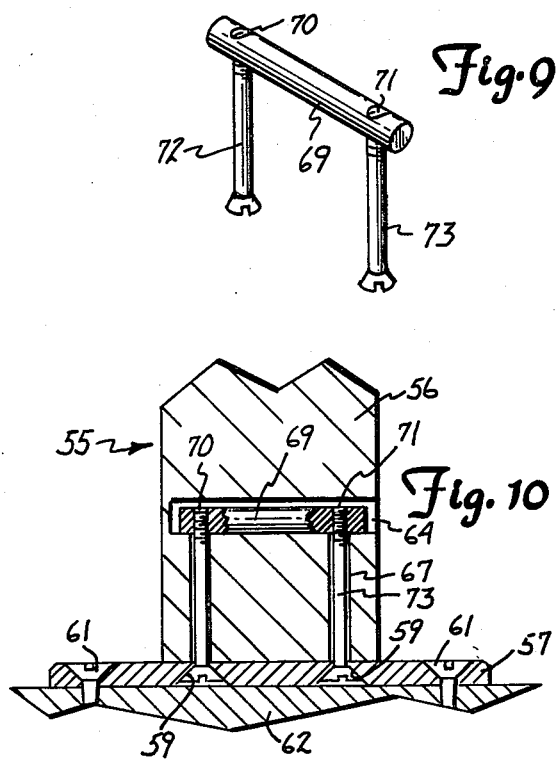
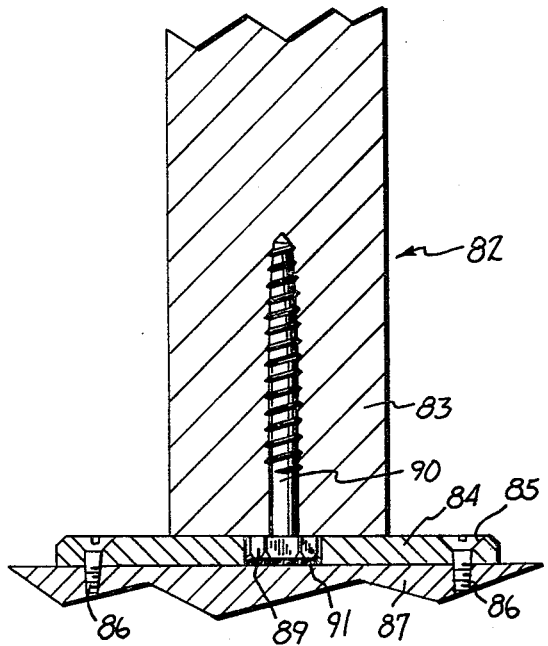
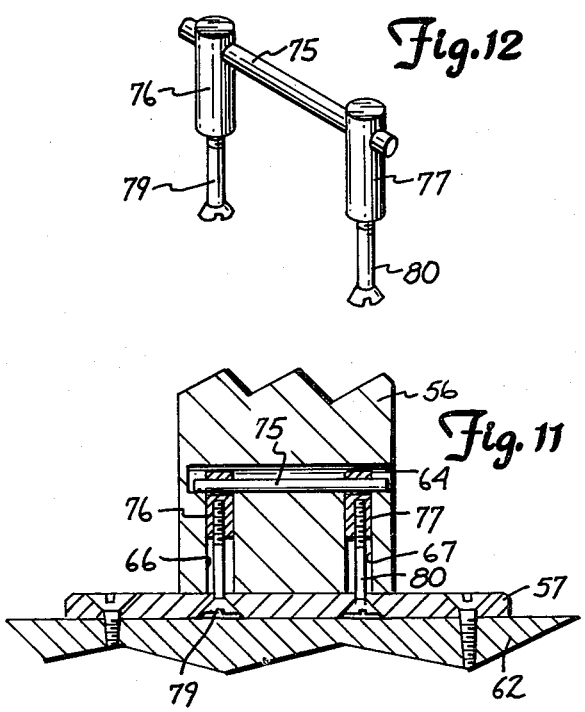

NEWEL POST ASSEMBLY

CROSS REFERENCE TO RELATED APPLICATION

This application is a continuation-in-part of U.S. application Ser. No. 123,841 filed Feb. 22, 1980, now U.S. Pat. No. 4,295,638 entitled Newel Post Assembly.

SUMMARY OF THE INVENTION

The invention pertains to the newel post assembly to support a rail assembly such as a stairway handrail. In the prior art, newel posts are fastened to a floor by installation in a hole cut through the floor. Bracing is placed between floor joists located proximate the intended location of the newel post, and the lower end of the newel post is secured to the bracing. Where floor joists cross beneath the intended location of the newel post, or where there is a finished ceiling beneath the floor of the intended location of the newel post thereby limiting access to the floor joists, this method cannot be employed. Generally then, a hole is cut just through the subfloor and the newel post is fastened therein as best as can be done with shims, toenail fasteners, and the like.

The present invention pertains to a newel post assembly to locate a newel post at any desired or necessary location in a sturdy and secure manner. The assembly includes a newel post for intended use in an upright disposition for connection to a railing, and a newel post anchor plate or base assembled to the bottom or foot of the newel post. The newel post is assembled to the anchor plate with an edge of the newel post in alignment with one edge of the anchor plate to permit assembly of the newel post flush against a wall. A first set of holes is provided for assembly of the newel post anchor plate to the bottom or foot of the newel post. Fasteners such as screws extend upwardly through holes provided in the bottom surface of the anchor plate into the newel post. A second set of holes is provided in the anchor plate for fastening the anchor plate to a floor or other floor structures such as floor joists. Fasteners such a screws are provided which extend downwardly from the upper surface of the plate into the floor or floor support structure. The newel post is thus held firmly and securely in position. In one form of the invention, an inverted u-shaped tie bar assembly has a horizontal tie bar located in an opening in the bottom portion of the newel post. Vertical fasteners extend between the anchor plate and the tie bar to secure the anchor plate to the newel post. The anchor plate is relatively thin and thus can be easily covered by carpeting and does not produce an unsightly bulge.

IN THE DRAWINGS

FIG. 3 is an enlarged assembly view of a newel post assembly according to the invention;

FIG. 5 is a sectional view of a newel post assembly of FIG. 4 taken along the line 5—5 thereof;

FIG. 6 is another sectional view of the newel post assembly of FIG. 4 taken along the line 6—6 thereof;

FIG. 7 is a side elevational view of one of the newel post assemblies shown in FIG. 1 taken along the line 7—7 thereof.

FIG. 8 is a perspective view of a newel post assembly according to a second form of the invention;

FIG. 9 is a perspective view of the tie bar assembly of the newel post assembly of FIG. 8;

FIG. 10 is a sectional view of the newel post assembly of FIG. 8 taken along the line 10—10 thereof shown installed to a floor surface;

FIG. 11 is a sectional view like that of FIG. 10 of a newel post assembly according to a third form of the invention;

FIG. 12 is a perspective view of the tie bar assembly of the newel post assembly of FIG. 11; and FIG. 13 is a sectional view like that of FIG. 10 showing a newel post assembly according to a fourth form of the invention.

DESCRIPTION OF PREFERRED EMBODIMENTS

Figure 1:
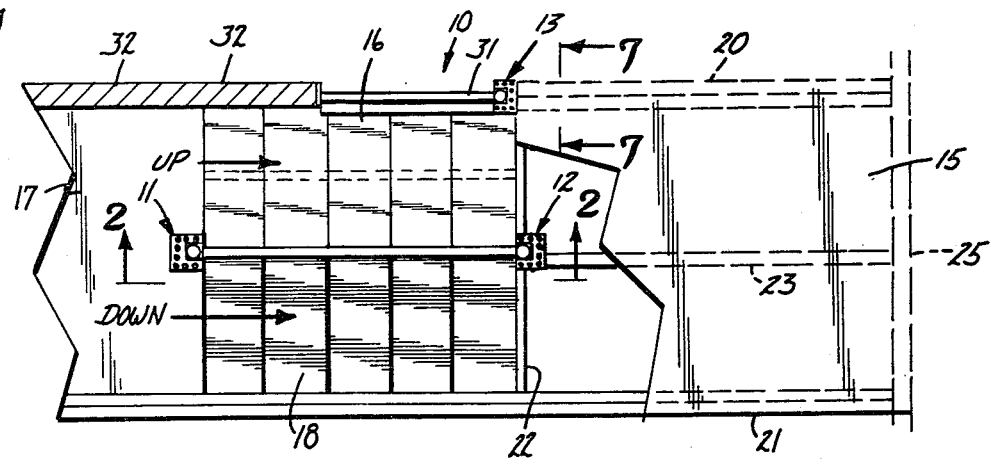
FIG. 1 is a top plan view of a split level staircase with portions removed for purposes of illustration and having newel post assemblies according to a first form of the invention; a FIG. 2 is an enlarged side elevational view of a portion of the stair case of FIG. 1 taken along the line 2—2 thereof.
Figure 2:
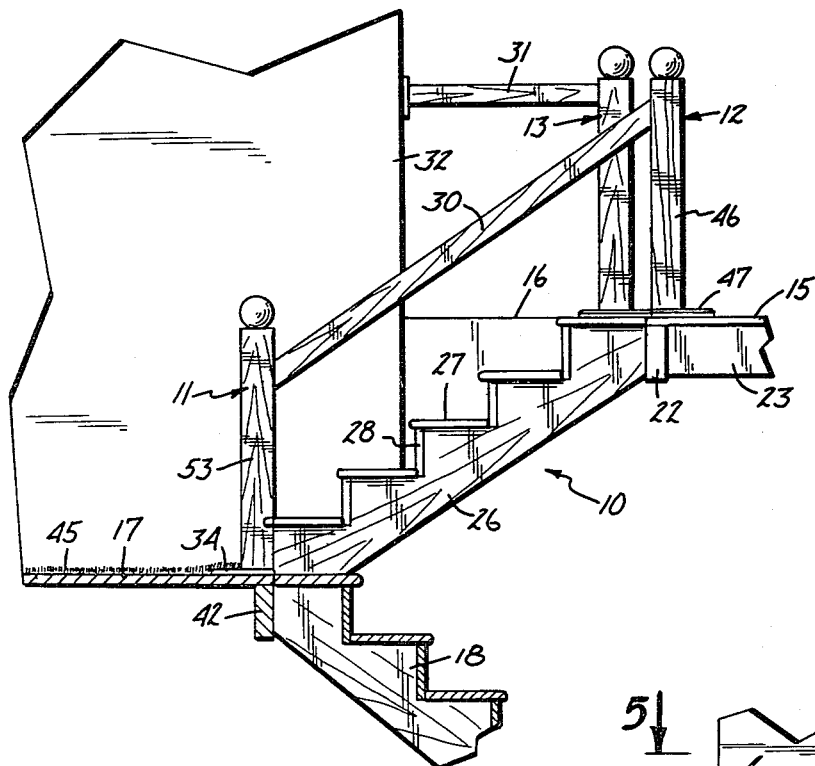

Referring to the drawings, there is shown in FIGS. 1 and 2 a staircase 10 equipped with a plurality of newel post assemblies according to a first form of the invention indicated at 11, 12 and 13. Staircase 10 is installed in a residential unit of the split level variety having upper floor 15 with a first stairway 16 leading downward to an intermediate floor on landing 17. A second stairway 18 leads from the landing 17 down to the lower floor.

Upper floor 15 is supported by a plurality of floor joists in conventional fashion. Double joist assemblies are used in straddling relationship to stairway openings. The opening for stairway 10 is straddled by double joist assemblies 20, 21. A header joist 22 extends between double joist assemblies 20, 21 at the threshold of staircase 10 to a rim joist 25.

As shown in FIG. 2, first stairway 16 includes a plurality of elongate, notched stair support beams 26 diagonally extended between header joist 22 and landing 17. Horizontal treads 27 are disposed between the horizontal surfaces of notched beams 26 to form the horizontal stairway treads. Vertical risers 28 are fixed to the vertical portion of the notches of the stairway beams 26 and extend between beams 26 to form the stairway risers. The stairway treads overlap and extend outward beyond the stairway risers. First newel post assembly 11 is located at the base of stairway 16, and second newel post assembly 12 is located at the upper end of stairway 16. A diagonal handrailing 30 extends between first and second newel post assemblies 11, 12. As shown in FIG. 1, a third newel post assembly 13 located at the top of stairway 16 opposite the second newel post assembly 12. Stairway 16 is partially open, whereby a second railing 31 extends from the third newel post assembly 13 to a studwall 32. Second railing 31 is horizontal and serves to guard the stairway opening formed by the first stairway 10.

The first, second and third newel post assemblies 11, 12 and 13 are identical in construction and are shown at different locations in FIGS. 1 and 2 to illustrate versatility of the assembly.

Figure 4:
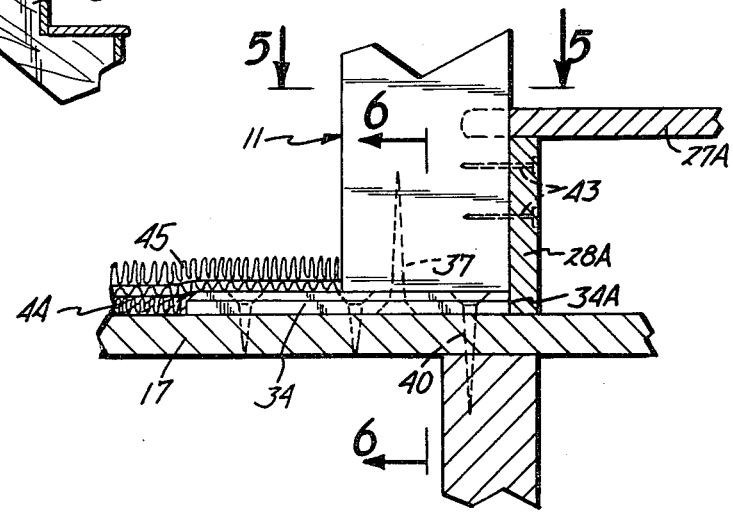
FIG. 4 is an enlarged side elevational view of one of the newel post assemblies shown in FIG. 2.

As shown in FIGS. 2 and 4, first newel post assembly 11 includes a wooden newel post 33 assembled to a flat anchor plate or base 34. Referring to the assembly drawing of FIG. 3, base 34 is a generally rectangular flat metal member having first, second, third and fourth edges 34A, B, C, D orientated in perpendicular relationship with edges 34A and C being parallel to one another and perpendicular to the second and fourth edges 34B, D. Base 34 has a first array of symetrically spaced strategically located interior openings or holes 36. Holes 36 are upwardly countersunk from a first or lower side of plate 34 or from the side of plate 34 in engagement with the floor when installed as shown in FIGS. 4 and 6. First flat head screws 37 pass upwardly through the holes 36 and are secured in the lower end of newel post 33 to securely attach the newel post 33 and base 34. Newel post 33 can have a standard three to three and one-half inch square base (7.6 to 8.9 cm.) with a transverse bottom surface that will cover the pattern formed by holes 36. Holes 36 can, for example, form a 1¾ inch square pattern (4.4 cm.). The holes 36 are centrally located between the second and fourth edges 34B, D but are more closely orientated to the first edge 34A than its corresponding parallel edge 34C. Holes 36 are thus orientated whereby installation of the newel post 33 with respect to the holes 36 can be accomplished with a surface of the newel post 33 flush with the edge 34A, of plate 34 permitting mounting of the newel post 33 with one side flush to the vertical surface. A second array or exterior set of strategically located holes is formed by holes 39 which encompass the first array of holes 36 along three edges 34B, C, and D of plate 34. The holes 39 are generally aligned in parallel relationship to the second, third and fourth edges 34B, C, D of plate 34 and lie along the perimeter of plate 34 at an area unoccupied by the base of the newel post 33 when assembled by the screws 37. As shown, eight holes 39 are provided, one at each corner of base 34, an additional one intermediate along the second and fourth edges 34B, D, and two additional holes 39 intermediate along the third edge 34C of plate 34. The second holes 39 are downwardly countersunk from the second or upper side of plate 34. The first and second arrays of holes 36, 39 together form a matrix of three rows of holes parallel to first edge 34A. A first row of holes adjacent first edge 34A is comprised of outer holes 39 downwardly countersunk from the top or second side of plate 34, and two intermediate holes 36 upwardly countersunk from the first or lower side of plate 34. The second row of holes is approximately midway between first and third edges 34A, 34C and also comprises outer holes 39 downwardly countersunk from the top or second side of plate 34, and two intermediate holes 36 upwardly countersunk from the first or lower side of plate 34. The third row of holes comprises a row of four holes 39 adjacent second edge 34C and all downwardly countersunk from the top or second side of plate 34. As shown in FIG. 6, second holes 39 accommodate a second set of screws 40. Second screws 40 secure the base 34 with respect to an underlying surface 41 with the newel post 33 fastened to the upper side of base 34 by the first screws 36. The second holes 39 are strategically spaced about the base 34 in such a fashion that when the base 34 is mounted in the vicinity of an underlying floor joist, at least one of the holes 39 will overlie the joist to permit fastening thereto. The length of first and third edges 34A, C can be approximately six inches (15 cm.). With newel post 33 centered thereon, there will be approximately 1½ (3.8 cm.) inches between either side of newel post 33 and corresponding second and fourth edges 34B, D of plate 34. Second and fourth edges 34B, D can be approximately five inches (12.7 cm.). One surface of the newel post 33 will be flush with the first edge 34A and there will be approximately a two inch overhang between the third edge 34C and the corresponding surface of newel post 33.

As shown installed in FIGS. 2 and 4, first newel post assembly 11 is installed on the floor of landing 17 with the first edge 34A of plate 34 flush to the last step riser 28A. The corresponding side of newel post 33 is also being flush with respect to the last or lowest riser 28A. The overhang of the last stair tread 27A is notched out to accommodate the upwardly extending portion of newel post 33. A first set of screws 37 fastens the newel post 33 securely to the base 34. Second screws 40 extend downwardly into landing 17 at that location. For example, there can be a second header joist 42 located beneath the lowermost riser 28A in supportive relationship to the landing 17. The holes 39 located at the corners of the first and fourth edges 34A, 34D and first and second edges 34A, 34B of base 34 are disposed over the second header 42 such that screws 40 engaged in these holes will intercept the second header 42. Additional fasteners such as nails 43 can be driven through the side of the lowermost stair riser 28A and into the abutting surface of the newel post 33 to give the newel post assembly 11 additional support. Carpeting 45 is extended over the exposed portion of base 34 extending beyond the foot of the newel post 33. As the base 34 is relatively thin, for example ¼ inch gauge steel, the rise occurring in the carpet 45 as it passes over the second edge 34B of base 34 is slight. A carpet pad 44 can underlie carpet 45 and extend to the edge of base 34 whereby any noticeable bumps in carpet 45 where it covers base 34 are minimal. Floor 17 is depicted as wooden but could be of other material such as concrete wherein concrete anchors or screws would be usable to fasten base 34.

Second newel post assembly 12 is located at the top of the first stairway 16 and includes a wooden newel post 46 fastened to a flat metal base 47. The upper portion of the newel post 46 is connected to the upper portion of the first newel post 33 by diagonal handrail 30. Base 47 of second newel post assembly 12 is the same as the base 34 of first newel post assembly 11. One side of newel post 46 is mounted flush with a side or edge of the base 47 and that edge is disposed over the header beam 22 such that adjacent exterior holes can be used for holding screws to be secured in the header 22. In addition, the line of exterior holes disposed along the opposite edge of base 47 is such that one of them will be disposed over the intermediate joist 23 where it intercepts the header joist 22 for fastening thereto.

Third newel post assembly is mounted adjacent the open stairwell and is connected to the horizontal railing 31 guarding the open stairwell. As shown in FIG. 7, the third newel post assembly includes a wooden newel post 49 connected to a flat metal base 50. Base 50 is of the same construction as base 34 of the first newel post assembly 11. Third newel post assembly 13 is located directly over the double joist assembly 20 that straddles the stairwell 10 such that screws passing through central exterior holes in the base 50 pass directly into the joist 20 to securely hold the third newel post assembly 13 in place. At the location of the double joist 20, the floor 15 overlaps or overhangs as at 15A into the area of stairwell 10. This overhang is typically a distance of 1½ to 2 inches (3.8+5 cm.). With a three-inch square newel post 49, the distance between the side of the newel post and the outer edge of the plate is 1½ inches. The base 50 is nicely accommodated over the joists 20 and does not extend beyond the overlap 15A of floor 15. A carpet 51 is held in covering relationship to the floor 15 and base 50 of newel post assembly 13 and is turned over and under the overlapping portion of 15A of floor 15 and secured thereunder. A carpet pad 52 lies under carpet 51 and terminates at the edge of base 50.

Referring to FIGS. 8 through 10, there is shown a newel post assembly indicated generally at 55 according to a second form of the invention. Newel post assembly 55 includes a newel post 56 assembled to a flat anchor plate or base 57. Plate 57 is a generally rectangular flat metal member having first, second, third and fourth edges 57A, B, C, D orientated in perpendicular relationship to one another. Plate 57 has a first array of symmetrically spaced strategically located interior openings or holes 59, two of which are shown in FIG. 10. Holes 59 can be upwardly countersunk from the bottom side of plate 57 and can be orientated in a square pattern adjacent the first edge 57A of plate 57 in like fashion to the first set of holes 36 disposed on plate 34 shown in FIG. 3, thus to permit mounting of newel post 56 with a side flush to the first edge 57 of plate 57. A second array or exterior set of strategically located holes is formed by holes 60 which encompass the first array of holes 59 along three edges 57B, C, D of plate 57 and lie along the perimeter of plate 57 at an area unoccupied by the base of newel post 56. There can be eight holes 60 formed in a pattern like the second set of holes 39 formed in plate 34 shown in FIG. 3. The holes 60 can be downwardly countersunk from the top side of plate 57. Fasteners or screws 61 extend through the second openings 60 and fasten the plate 57 to a floor type surface 62.

Inverted, U-shaped tie bar assemblies securely fasten newel post 56 to anchor plate 57. As shown in FIG. 8, newel post 56 has a pair of transverse, parallel horizontal cylindrical openings or bores 64, 65 near the bottom end thereof and open at one side surface of post 56. As shown in FIG. 10, a pair of vertical openings or bores 66, 67 extend from the lower end of newel post 56 upwardly to and interesect the horizontal bore 64 to form an inverted U-shaped opening. The lower end of the vertical bores 66, 67 are positioned generally in alignment with holes 59 of the first set of holes in plate 57. An anchoring member of tie bar 69 is situated in the horizontal bore 64 and has threaded openings 70, 71. The threaded openings 70, 71 are positioned over the upper ends of the vertical bores 66, 67. Elongate linear fasteners shown to be flathead bolts 72, 73 extend upwardly through the first holes 59 aligned with vertical bores 66, 67 and upwardly through the vertical bores 66, 67. The heads of bolts 72, 73 bear against the lower surface of plate 57. The upper ends of the bolts 72, 73 are in threaded engagement with the openings 70, 71 of tie bar 69 to urge the tie bar 69 downwardly in engagement with the bottom of horizontal bore 64 to secure newel post 56 relative to anchor plate 57. A second tie bar assembly is associated with the second horizontal bore 65 and a pair of corresponding vertical bores located over the remaining holes 59 of the first set of holes (not shown). With the newel post 56 assembled to the anchor plate 57, the newel post assembly 55 is installed with respect to a structure as earlier described relative to FIGS. 1 through 7. Once the newel post assembly is assembled, the horizontal bores 64, 65 can be closed for aesthetic purposes.

A second form of tie bar assembly is shown in FIGS. 11 and 12 wherein a cross tie bar 75 is disposed in the horizontal opening 64 of newel post 56. A pair of cylindrical numbers 76, 77 have upper diametric openings that are in sliding engagement with the end portions of the tie bar 75. The cylindrical members 76, 77 depend from the tie bar 75 into the vertical openings 66, 67 of newel post 56. The lower portions of cylindrical members 76, 77 have downwardly open threaded openings. Fasteners shown to be flathead bolts 79, 80 extend upwardly through the holes 59 of the first set of holes and upwardly into the vertical openings 66, 67. The upward end of bolts 79, 80 are threaded into the threaded openings of the cylindrical members 76, 77. The flathead bolts 79, 80 are tightened to an extent whereby the newel post 56 is firmly secured to the anchor plate 57.

An alternative form of newel post assembly according to the invention is shown in FIG. 13 and indicated generally at 82 wherein an upright newel post 83 is assembled to a flat plate 84. Plate 84 has a second set of outer peripheral holes 85 along second, third, and fourth edges as previously described relative to FIG. 3. Fasteners such as screws 86 pass through the holes 85 and into a floor type surface 87 to securely hold the base plate 84. Base plate 84 has a central opening 89 countersunk from the bottom side of base plate 84 and disposed intermediate the holes 85. A single elongate threaded fastener 90 having an upwardly pointed shank extends upwardly through the central hole 89 and into the bottom of newel post 83. Fastener 90 can be formed, for example, of an enlarged elongate flat head lag bolt that is effective to securely hold the bottom of newel post 83 in contact with the anchor plate 84. Fastener 90 is rigidly secured to plate 64 as by a weld 91 at the lower edge of central opening 89. Plate 84 is installed on a newel post by positioning it at the lower end of the newel post and turning or twisting it in a direction to thread or screw fastener 90 into the end of the newel post.

While there has been shown and described various embodiments of newel post assemblies according to the invention, it will be apparent that variations and deviations can be had from the embodiments shown without departing from the scope and spirit of the invention.

The embodiments of the invention in which an exclusive property or privilege is claimed are defined as follows:

1. A newel post assembly for installation with respect to a floor type surface, comprising:
   an elongate wooden newel post for intended use in a generally upright orientation and having a transverse bottom surface;
   said newel post having a generally horizontal opening near the lower end thereof;
   said newel post having a generally vertical opening extending from the bottom surface to the horizontal opening;
   an anchoring member positioned in the horizontal opening;
   a base plate in surface engagement with the transverse bottom surface of the newel post, said plate defined by first, second, third and fourth edges respectively with transverse dimensions greater than the bottom surface of the newel first fastening means connected at one end to the base plate, extending through the vertical opening and connected at an opposite end to the anchoring member to secure the base plate to the newel post generally adjacent the first of said base edges; and
   means to connect the base plate to floor type surface comprised as a plurality of mounting holes disposed proximate the second, third and fourth edges of said base plate in surrounding relationship to said newel post, and second linear fastening means extending from the upper surface of the base plate through the mounting holes with respect to a floor type surface.

2. The newel post assembly of claim 1 wherein:
base plate has a first mounting hole positioned generally in alignment with the vertical opening in the newel post;
said first fastening means including an elongate first linear fastener extending through the first mounting hole in the base plate, through the vertical opening and connected to the anchoring member; and
said mounting holes proximate to the second, third and fourth base edges comprising second mounting holes.

3. The newel post assembly of claim 2 wherein: the anchoring member is a tie bar having a threaded opening positioned over the vertical opening of the newel post;
said first mounting hole in the base plate being upwardly countersunk from the bottom side of the base plate;
said first linear fastener being comprised as a flathead bolt extending through the mounting opening and having a threaded end threaded into the opening of the tie bar.

4. A newel post assembly for installation with respect to a floor type surface, comprising:
an elongate wooden newel post for intended use in a generally upright orientation and having a transverse bottom surface;
said newel post having a generally horizontal opening near the lower end thereof;
said newel post having a generally vertical opening extending from the bottom surface to the horizontal opening;
an anchoring member positioned in the horizontal opening comprised as a tie bar having a threaded opening positioned over the vertical opening of the newel post;
a base plate in surface engagement with the transverse bottom surface of the newel post, said base plate being generally rectangular in shape defined by first, second, third and fourth edges respectively with transverse dimensions greater than the bottom surface of the newel post;
said base plate having a first mounting hole positioned generally in alignment with the vertical opening in the newel post and being upwardly countersunk from the bottom side of the base plate;
fastening means comprised as a flat head bolt extending through the first mounting hole in the base plate through the vertical opening and having a threaded end threaded into the opening of the tie bar;
said newel post being positioned with a side surface in flush relationship to the first of said edges and positioned midway between the second and fourth of said edges; and
a plurality of mounting holes in alignment with the second, third and fourth edges and a plurality of linear fasteners extended through the mounting holes aligned with the second, third and fourth edges to mount the base plate to a floor type surface.

5. A newel post assembly for installation with respect to a floor type surface, comprising:
an elongate wooden newel post for intended use in a generally upright orientation and having a transverse bottom surface;
said newel post having a generally horizontal bore located near the lower end thereof;
said newel post having a first generally vertical bore extending from the bottom surface to the horizontal bore, and a second generally vertical bore spaced from the first vertical bore and extending from the bottom surface to the horizontal bore;
a base plate in surface engagement with the transverse bottom surface of the newel post, said base plate defined by first, second, third and fourth edges respectively with transverse dimensions greater than the bottom surface of the newel post;
a tie bar located in the horizontal bore;
a first elongate fastener connected at one end to the base plate extending through the first vertical bore and connected at the opposite end to the tie bar, and a second elongate fastener connected at one end to the base plate, extending through the second vertical bore and connected at the opposite end to the tie bar to secure the base plate to the newel post generally adjacent the first of said base edges; and
means to connect the base plate to a floor type surface including a plurality of base plate mounting holes in alignment with the second, third and fourth edges and a plurality of linear base plate mounting fasteners extended through the mounting holes aligned with the second, third and fourth edges to mount the base plate to a floor.

6. The newel post assembly of claim 5 wherein:
said base plate has first and second mounting holes of a first set of mounting holes positioned generally in alignment with the first and second vertical bores respectively;
said first and second fasteners extending through the first and second mounting holes into the first and second vertical bores.

7. The newel post assembly of claim 6 wherein:
said tie bar has first and second threaded openings located aligned with the first and second vertical bores;
said fasteners being constituted as bolts having threaded end in threaded engagement with the first and second threaded openings of the tie bar.

8. A newel post assembly for installation with respect to a floor type surface, comprising:
an elongate wooden newel post for intended use in a generally upright orientation and having a transverse bottom surface;
said newel post having a first generally horizontal bore located near the lower end thereof;
said newel post having a first generally vertical bore extending from the bottom surface to the first horizontal bore, and a second generally vertical bore spaced from the first vertical bore and extending from the bottom surface to the first horizontal bore;
a base plate in surface engagement with transverse bottom surface of the newel post and having first and second mounting holes of a first set of mounting holes positioned generally in alignment with the first and second vertical bores respectively;
a first tie bar located in the first horizontal bore;

a first elongate fastener extending through the first mounting hole into the first vertical bore and connected at the opposite end to the first tie bar, and a second elongate fastener extending through the second mounting hole into the second vertical bore and connected at the opposite end to the first tie bar;

said newel post having a second generally horizontal bore located near the lower end thereof, a third vertical bore extending from the bottom surface to the second horizontal bore, a fourth generally vertical bore spaced from the third vertical bore and extending from the bottom surface to the second horizontal bore;

a second tie bar located in the second horizontal bore;

said base plate having third and fourth mounting holes of said first set of mounting holes positioned generally in alignment with the third and fourth vertical bores;

a third fastener extending through the third mounting hole and through the third vertical bore and connected to the second tie bar;

a fourth fastener extending through the fourth mounting hole and the fourth vertical bore and being connected to the second tie bar; and means to connect the base plate to a floor type surface.

9. The newel post assembly of claim 8 wherein:

said first, second, third and fourth fasteners are constituted as flathead bolts.

10. The newel post assembly of claim 6 or 8 wherein:

the mounting holes of the first set of holes are upwardly countersunk from the bottom side of the base plate.

11. The newel post assembly of claim 8 wherein:

said base plate is generally rectangular having sequentially first, second, third and fourth edges with transverse dimensions greater than that of the newel post, said first set of holes being located intermediate the second and fourth edges, said transverse bottom surface of the newel post being mounted over the first set of holes with a side surface of the newel post in flush relationship with the first edge;

a second set of mounting holes located in said base plate and located proximate the second, third and fourth edges of said plate in surrounding relationship to said newel post, and second linear fastening means extending from the upper surface of said base plate with respect to the floor type surface.

12. A newel post assembly for installation with respect to a floor type surface, comprising:

an elongate wooden newel post for intended use in a generally upright orientation and having a transverse bottom surface;

said newel post having a generally horizontal bore located near the lower end thereof;

said newel post having a first generally vertical bore extending from the bottom surface to the horizontal bore, and a second generally vertical bore spaced from the first vertical bore and extending from the bottom surface to the horizontal bore;

a base plate in surface engagement with the transverse bottom surface of the newel post and having first and second mounting holes of a first set of mounting holes positioned generally in alignment with the first and second vertical bores respectively;

a tie bar located in the horizontal bore;

a first elongate fastener extending through the first mounting hole into the first vertical bore and connected at the opposite end to the tie bar, and a second elongate fastener extending through the second mounting hole into the second vertical bore and connected at the opposite end to the tie bar;

said first fastener including a first cylindrical member having an upper diametric opening in sliding engagement with one end portion of the tie bar and depending into the first vertical opening and having a downwardly open threaded opening, a first bolt extended from the plate into the first vertical opening and being threaded into the threaded opening of the first cylindrical member;

said second fastener including a second cylindrical member having an upper diametric opening in sliding engagement with the opposite end of the tie bar and depending into the second vertical opening and having a downwardly open threaded opening, a second bolt extended from the plate into the second vertical opening and being in threaded engagement with the second cylindrical member; and means to connect the base plate to a floor type surface.

13. The newel post assembly of claim 12 wherein:

said newel post has a second generally horizontal bore located near the lower end thereof, a third vertical bore extending from the bottom surface to the second horizontal bore, a fourth generally vertical bore spaced from the third vertical bore and extending from the bottom surface to the second horizontal bore;

a second tie bar located in the second horizontal bore;

said base plate having third and fourth mounting holes of said first set of mounting holes positioned generally in alignment with the third and fourth vertical bores;

a third fastener extending through the third mounting hole and through the third vertical bore and connected to the second tie bar; and a fourth fastener extending through the fourth mounting hole and the fourth vertical bore and being connected to the second tie bar.

14. The newel post assembly of claim 13 wherein:

said first, second, third and fourth fasteners are constituted as flathead bolts.

15. The newel post assembly of claim 14 wherein:

the mounting holes of the first set of holes are upwardly countersunk from the bottom of the base plate.

16. A newel post assembly for installation with respect to a floor type surface comprising:

an elongate wooden newal post for intended use in a generally upright orientation and having a transverse bottom surface;

a newel post base comprised as a flat plate member generally rectangular in shape defined by first, second, third and fourth edges respectively and having top and bottom sides with transverse dimensions greater than the bottom surface of the newel post;

said bottom surface of the newel post being positioned in surface contact with the upper side of the plate member positioned between the second and fourth edges with a side of the newel post orientated in flush relationship to the first edge of the plate member;

a first upwardly countersunk mounting hole located in the plate member beneath the newel post;

a fastening member having a head located in the first mounting hole and fixed therein and having an upwardly pointed threaded shank extended into the bottom portion of the newel post to secure the newel post to the plate member; and a set of second mounting holes located in said plate member and located proximate the second, third and fourth edges of said plate member in surrounding relationship to said newel post, and second linear fastening means extending from the upper surface of said plate member through the mounting holes to secure the plate member with respect to the floor type surface.

17. The newel post assembly of claim 16 wherein:
said fastening member comprises an elongate wood screw extended through an upwardly countersunk opening in the plate member into the newel post and having a head located in the countersunk opening and secured therein by a weld.

* * * * *

UNITED STATES PATENT AND TRADEMARK OFFICE
CERTIFICATE OF CORRECTION

PATENT NO. : 4,367,864

DATED : January 11, 1983

INVENTOR(S) : Gene H. Eldeen

It is certified that error appears in the above-identified patent and that said Letters Patent is hereby corrected as shown below:

Column 1, line 43, "a" should be -- as --.

Column 1, line 47, "u-shaped" should be -- U-shaped --.

Column 1, line 59, cancel "a" after -- invention --.

Column 1, line 61, "stair case" should be -- staircase --.

Column 2, line 5, "thereof." should be -- thereof; --.

Column 2, line 53, after "13" insert -- is --.

Column 3, line 4, "symetrically" should be -- symmetrically --.

Column 5, line 2, "held" should be -- laid --.

Column 5, line 22, "57" (first occurrence) should be --57A --.

Column 10, line 54, "newal" should be -- newel --.

Signed and Sealed this

Twenty-fifth Day of October 1983

[SEAL]

Attest:

GERALD J. MOSSINGHOFF

Attesting Officer

Commissioner of Patents and Trademarks